United States Patent
Yao et al.

(10) Patent No.: US 9,655,117 B2
(45) Date of Patent: May 16, 2017

(54) CONTROL OF CARRIER AGGREGATION (75) Inventors: Yizhi Yao, Beijing (CN); Clemens Suerbaum, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/403,207

(22) PCT Filed: May 25, 2012

(86) PCT No.: PCT/CN2012/076127
§ 371 (c)(1),
(2), (4) Date: Nov. 24, 2014

(87) PCT Pub. No.: WO2013/174021
PCT Pub. Date: Nov. 28, 2013

(65) Prior Publication Data
US 2015/0156773 A1 Jun. 4, 2015

(51) Int. Cl.
*H04L 1/00* (2006.01)
*H04W 72/04* (2009.01)
(Continued)

(52) U.S. Cl.
CPC ......... *H04W 72/0453* (2013.01); *H04L 5/001* (2013.01); *H04W 24/08* (2013.01);
(Continued)

(58) Field of Classification Search
CPC ......... H04W 36/0072; H04W 36/0088; H04W 36/0083; H04W 48/02; H04W 48/12;
(Continued)

(56) References Cited

U.S. PATENT DOCUMENTS

2010/0273416 A1\* 10/2010 Yi ............... H04B 7/155
455/9
2011/0149913 A1\* 6/2011 Park .............. H04W 36/0083
370/332
(Continued)

FOREIGN PATENT DOCUMENTS

CN   WO 2011069457 A1 \*  6/2011   ............ H04W 24/10
CN       102238692 A      11/2011
(Continued)

OTHER PUBLICATIONS

3GPP TR 36.808 V1.7.0; "3rd Generation Partnership Project; Technical Specification Group Radio Access Network; Evolved Universal Terrestrial Radio Access (E-UTRA); Carrier Aggregation; Base Station (BS) radio transmission and reception (Release 10)"; Aug. 2011; whole document (27 pages).

(Continued)

*Primary Examiner* — Jutai Kao
(74) *Attorney, Agent, or Firm* — Harrington & Smith (57) ABSTRACT

A method and an apparatus are described by which carrier aggregation in a radio network is controlled on the basis of a group of cells which can be aggregated. For example, carrier aggregation group information regarding the group of cells which can be aggregated can be established, transmitted, read and the like, access control policy regarding the group of cells in the radio network which can be aggregated can be set. Moreover, a method and an apparatus is provided by which carrier aggregation in a radio network is controlled, wherein an access control policy regarding a part of the radio network is set.

15 Claims, 7 Drawing Sheets

(51) Int. Cl.
*H04L 5/00* (2006.01)
*H04W 24/08* (2009.01)
*H04W 48/02* (2009.01)
*H04W 36/00* (2009.01)
*H04W 48/12* (2009.01)

(52) U.S. Cl.
CPC ....... *H04W 36/0072* (2013.01); *H04W 48/02* (2013.01); *H04L 5/0035* (2013.01); *H04L 5/0044* (2013.01); *H04W 36/0083* (2013.01); *H04W 36/0088* (2013.01); *H04W 48/12* (2013.01)

(58) Field of Classification Search
CPC  H04W 72/04; H04W 72/0453; H04L 5/0035; H04L 5/0044; H04L 5/0031; H04L 5/001
See application file for complete search history.

(56) References Cited

U.S. PATENT DOCUMENTS

| | | | | |
|---|---|---|---|---|
| 2012/0014357 | A1* | 1/2012 | Jung | H04L 5/0035 370/332 |
| 2012/0039175 | A1* | 2/2012 | Sridhar | H04L 47/125 370/236 |
| 2012/0087257 | A1* | 4/2012 | Larsson | H04L 5/001 370/252 |
| 2012/0250562 | A1* | 10/2012 | Li | H04W 24/10 370/252 |

FOREIGN PATENT DOCUMENTS

| | | |
|---|---|---|
| EP | 2373090 A1 | 10/2011 |
| WO | WO-2011/143837 A1 | 11/2011 |

OTHER PUBLICATIONS

3GPP TS 36.423 V11.0.0; "3$^{rd}$ Generation Partnership Project; Technical Specification Group Radio Access Network; Evolved Universal Terrestrial Radio Access (E-UTRA); X2 application protocol (X2AP) (Release 11)"; Mar. 2012; whole document (134 pages).

3GPP TS 32.762.V11.7.0; "3$^{rd}$ Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information service (IS) (Release 11)"; Mar. 2014; whole document (59 pages).

3GPP TS 32.425 V12.0.0; "3$^{rd}$ Generation Partnership Project; Technical Specification Group Services and System Aspects; Telecommunication management; Performance Management (PM); Performance measurements Evolved Universal Terrestrial Radio Access Network (E-UTRAN) (Release 12)"; Jun. 2013; whole document (74 pages).

3GPP TS 32.522 V11.7.0; "3$^{rd}$ Generation Partnership Project; Technical Specification Group Services and System Aspects; Telecommunication management; Self-Organizing Networks (SON) Policy Network Resource Model (NRM) Integration Reference Point (IRP);; Information Services (IS) (Release 11)"; Sep. 2013; whole document (58 pages).

3GPP TS 36.300 V12.3.0; "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Sep. 2014; whole document (215 pages).

\* cited by examiner

| IE/Group Name | Presence | Range | IE type and reference | Semantics description | Criticality | Assigned Criticality |
|---|---|---|---|---|---|---|
| ... | | | | | | |
| Served Cells | | 1..<maxCellineNB> | | Complete list of cells served by the eNB | YES | reject |
| >Served Cell Information | M | | 9.2.8 | | – | – |
| >CA Groups (NEW) | C- if CA is supported | | | | – | – |
| >>CA Group ID (NEW) | M | | INTEGER (0..x) | CA GroupID | – | – |
| >>My Layer Number (NEW) | O | | INTEGER (0..x) | The layer number that the cell is at. | – | – |
| ... | | | | | | |

Fig. 4A

| IE/Group Name | Presence | Range | IE type and reference | Semantics description | Criti-cality | Assigned Criticality |
|---|---|---|---|---|---|---|
| ... | | | | | | |
| Served Cells To Add | | 0 .. <maxCellineNB> | | Complete list of added cells served by the eNB | GLOBAL | reject |
| >Served Cell Information | M | | 9.2.8 | | | -- |
| >CA Groups (NEW) | C-if CA is supported | | | | | -- |
| >>CA Group ID (NEW) | M | | INTEGER (0..x) | CA GroupID | | -- |
| >>My Layer Number (NEW) | O | | INTEGER (0..x) | The layer number that the cell is at. | | -- |
| ... | | | | | | |
| Served Cells To Modify | | 0 .. <maxCellineNB> | | Complete list of modified cells served by the eNB | GLOBAL | reject |
| >Old ECGI | M | | ECGI 9.2.14 | This is the old E-UTRAN Cell Global Identifier | | -- |
| >Served Cell Information | M | | 9.2.8 | | | -- |
| >CA Groups (NEW) | C-if CA is supported | | | | | -- |
| >>CA Group ID (NEW) | M | | INTEGER (0..x) | CA GroupID | | -- |
| >>My Layer Number (NEW) | O | | INTEGER (0..x) | The layer number that the cell is at. | | -- |

Fig. 4B

| IE/Group Name | Presence | Range | IE type and reference | Semantics description | Criticality | Assigned Criticality |
|---|---|---|---|---|---|---|
| ... | | | | | | |
| Cell ID | M | | ECGI 9.2.14 | | — | — |
| CA Groups (NEW) | C- if CA is supported | | | | — | — |
| >CA Group ID (NEW) | M | | INTEGER (0..x) | CA GroupID | — | — |
| >My Layer Number (NEW) | O | | INTEGER (0..x) | The layer number that the cell is at. | — | — |
| ... | | | | | | |

Fig. 4C

CONTROL OF CARRIER AGGREGATION

FIELD OF THE INVENTION

The present invention relates to apparatuses, methods and a computer program product for controlling of carrier aggregation.

RELATED BACKGROUND ART

The following meanings for the abbreviations used in this specification apply:
ANR Automatic Neighbour Relation
CA Carrier Aggregation
EMS Element Management System
E-RAB E-UTRAN Radio Access Bearer
E-UTRAN Evolved Universal Terrestrial Radio Access Network
HO Handover
IE Information Element
IOC Information Object Class
Itf-N Interface defined between network manager and element manager
NBI Northbound Interface
NMS Network management system
OAM Operation and Maintenance
PCell Primary Cell
QCI Quality of Service (QoS) Class Identifier
QoS Quality of Service
SCell Secondary Cell
SON Self Organizing Network
UE User Equipment Embodiments of the present invention relate to carrier aggregation. Carrier Aggregation (CA) is a radio technology which allows combining several carriers of different cells such that a UE—and finally the end user—has a higher bandwidth available, allowing a better user experience.

According to the deployment scenarios defined in TS 36.300, a set of carries/cells under the same eNB can be aggregated for one UE in some certain area.

However, in order to fully exploit the benefits of carrier aggregation, management and control thereof need to be further improved.

SUMMARY OF THE INVENTION

Embodiments of the present invention address this situation.

According to a first aspect of the present invention a method is provided which comprises
controlling carrier aggregation in a radio network on the basis of a group of cells which can be aggregated.

According to a second aspect of the present invention, an apparatus is provided which comprises a connection unit configured to provide connection to a radio network and/or a network control element, and a processor configured to control carrier aggregation in a radio network on the basis of a group of cells in the radio network which can be aggregated.

The first and second aspects of the present invention may be modified by the following features:
A carrier aggregation group information regarding the group of cells which can be aggregated may be established.
Access control policy regarding the group of cells in the radio network which can be aggregated may be set.
Carrier aggregation group information regarding a group of cells in a radio network which can be aggregated may be transmitted.

Carrier aggregation group information regarding the group of cells which can be aggregated may be read, and the read carrier aggregation group information may then be processed.

Performance measurements may be performed on carrier aggregation group level.

The carrier aggregation group information may be exchanged between one base station and an element management system or a network management system. For example, the apparatus according to the second aspect may be or may be part of a base station, an element management system or a network management system, and the processor may be configured to exchange the carrier aggregation group information with another base station, element management system or network management system.

The carrier aggregation group information may be exchanged between two base stations via a predefined interface. For example, the apparatus according to the second aspect may be or may be part of a base station, and the processor may be configured to exchange the carrier aggregation group information with another base station, through the connection unit, via a predefined interface.

The carrier aggregation group information may be included during a neighbour setup to a base station, or the carrier aggregation group information may be added to already established neighbours of the base station.

The access policy may be to indicate, in case of insufficient resources, access of a user equipment to a cell group is denied, or access of the user equipment is admitted and resources for existing services are reduced.

Suitable cells belonging to a carrier aggregation group to perform carrier aggregation for a user equipment may be selected based on the carrier aggregation group information and/or suitable cells belonging to a carrier aggregation group to be involved in a handover of a user equipment may be selected based on the carrier aggregation group information.

Carrier aggregation group information may be included in an information message of a predefined information message type.

Carrier aggregation access policy information may be included as one or more attributes in the information message of the predefined information message type.

The carrier aggregation group information may be included as one or more attributes in the information message of the predefined information message type.

The carrier aggregation group information may be included in a dedicated information object class modeling the carrier aggregation group.

The carrier aggregation group information may be included as one or more attributes of the predefined information object class.

The carrier aggregation access policy information may be included as one or more attributes of the predefined information object class or a dedicated information object class modeling the carrier aggregation group.

According to a third aspect of the present invention a method is provided which comprises
controlling carrier aggregation in a radio network, and
setting access control policy regarding a part of the radio network.

According to a fourth aspect of the present invention, an apparatus is provided which comprises a connection unit configured to provide connection to a radio network and/or a network control element, and a processor configured to control carrier aggregation in a radio network, and to set an access control policy regarding a part of the radio network.

The third and fourth aspects may be modified as follows:
The part of the radio network may be a subnetwork, a base station, a group of base stations, a cell or a group of cells.
The access policy is to indicate, in case of insufficient resources, access of a user equipment to the part of the network is denied, or access of the user equipment is admitted and resources for existing services are reduced.

According to a fifth aspect of the present invention, a computer program product is provided which comprises code means for performing a method according to the first and/or the third aspects and its modifications when run on a processing means or module.

The computer program product may be embodied on a computer-readable medium.

Thus, according to embodiments of the present invention, control of carrier aggregation in a network is further improved.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

Before explaining some embodiments of the present invention in detail, some considerations regarding control and management of carrier aggregation are given in the following.

From management perspective, the operators need to know the maximum bandwidth that the network is able to offer as well as the network capacity in a certain area, so it is necessary to know which cells can be potentially aggregated together.

Figure 3A:
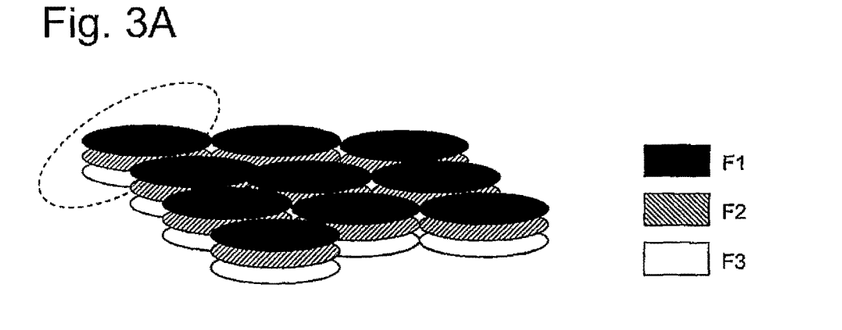
FIGS. 3A to 3C illustrate different scenarios of carrier aggregation.
Figure 3B:
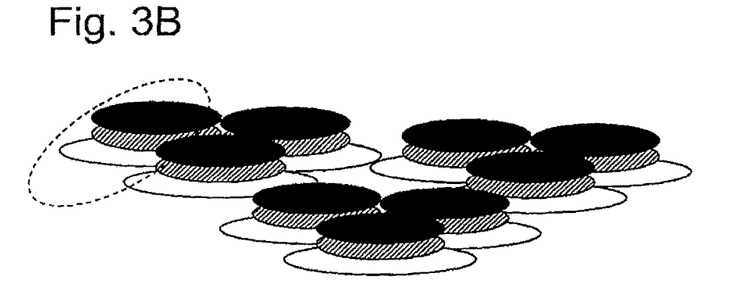
Figure 3C:
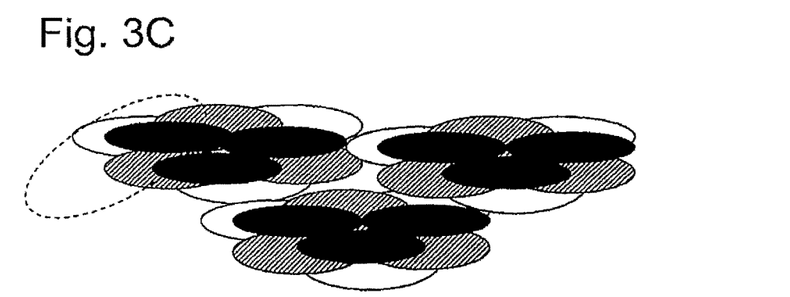

Some examples for such carrier aggregation scenarios are shown in FIGS. 3A to 3C and described in the following.

FIG. 3A to 3C show different CA scenarios, in which three different carriers whose frequencies are indicated by F1, F2 and F3 are present in a local area. Possibilities for carrier aggregation within an area encircled by a dashed ellipse are evaluated in the following. The examples only show 3 carries, but in reality the number of frequencies in some certain areas can be the also different from 3 but needs to be more than 1.

FIG. 3A shows a scenario in which the different carriers (cells) are all located in the same area, i.e., the cell sizes thereof are identical, and the cells fully overlap each other. The area indicated by the dashed ellipse contains three cells, so that these three cells in the dashed ellipse are able to be aggregated. The cells in dashed ellipse should not be aggregated with the cells outside the ellipse though their strength may be also strong at the border of the dashed ellipse.

FIG. 3B shows a scenario in which the F1 to F3 cells are concentric, but F2 and F3 cells are smaller than F1 cell. Similar as in the example of FIG. 3A, the three cells in the dashed ellipse are able to be aggregated. The cells in dashed ellipse should not be aggregated with the cells outside the ellipse though their strength may be also strong at the border of the dashed ellipse.

FIG. 3C shows a scenario in which the F1 to F3 cells do not overlap, e.g., they are served by different base stations. In the dashed ellipse, the F1 cell and F3 cell can be aggregated with either one of the F2 cells, but not both of the F2 cells at the same time. The F2 cells in the dashed ellipse can be respectively aggregated to the F1 cell and F3 cell outside but adjacent to the dashed ellipse.

Thus, the possibilities for carrier aggregation (aggregation of cells) may largely differ depending on the network configuration.

Also such info is needed for handover in CA, as the source eNB needs to know which cells can be aggregated together in the target side (especially in case of is the target cell(s) belong to an eNB different from the source eNB), to make the right selection of cells for the handover. If the eNB does not know this and selects cells which cannot be aggregated together in one handover or do not provide sufficient bandwidth after the handover, the handover will not be fully successful.

So it is desired to have such info about the aggregation capabilities. In 3GPP such relations between cells are usually modelled in neighbour relations objects, either by manual configuration or configured by the SON ANR functionality.

To measure the performance of CA, the traditional approach of measuring the E-RABs (e.g., the number of E-RABs, or the QoS of the E-RABs) in individual cells is not applicable in CA, because one E-RAB can be spread to multiple cells. For the carrier aggregation case the reasonable approach is to measure the E-RABs (e.g., the number of E-RABs, or the QoS of the E-RABs) for each group of cells that can be aggregated together.

The role (i.e. PCell or SCell) of each cell is acting in CA for each UE is decided by the eNB, while there is also the case that some certain cell is only configured to be SCell to all of the UEs without PCell functionality to any UEs during some time (or there may be some other configurations to make the cell only with PCell functionality). When a new UE is requesting to access the network while the overall resources or the resources for PCell functionality in the group of the cells that can be aggregated together are not sufficient, then the eNB needs to know what to do—to accept the new access request (maybe by downgrading the bandwidth to the existing UEs) or ignore the new access request and retain the existing services, such priorities need to be configured from OAM.

Thus, according to embodiments of the present invention, information regarding a group of cells which can be aggregated together is provided.

In the following, description will be made to embodiments of the present invention. It is to be understood, however, that the description is given by way of example only, and that the described embodiments are by no means to be understood as limiting the present invention thereto.

Figure 1:
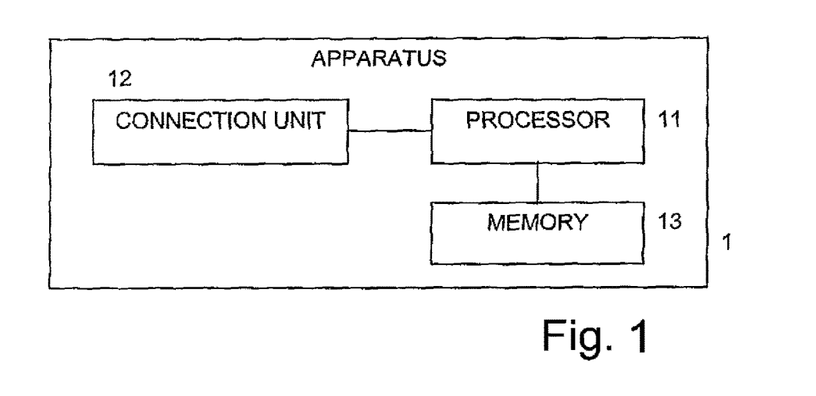
FIG. 1 shows a basic structure of an apparatus (e.g., an eNB) according to an embodiment of the present invention.

FIG. 1 shows an apparatus 1 according to a more general embodiment of the present invention. The apparatus may be, for example, an eNB.

However, this is only an example, and the invention may be implemented also in a network management system (NMS), an element management system (EMS), a separate self-organizing network (SON) server, the eNB or any other suitable network control node. The apparatus 1 comprises a processor 11 and an connection unit 12. The connection unit 12 is configured to provide connection to a network and/or an EMS/NMS, and the processor 11 is configured to control carrier aggregation in a radio network on the basis of a group of cells in a radio network which can be aggregated. Optionally, the eNB 1 may also comprise a memory 13 for storing data and programs, by means of which the processor 11 may carry out its corresponding functions.

Thus, a method according to a general embodiment of the present invention comprises controlling carrier aggregation in a radio network on the basis of a group of cells in a radio network which can be aggregated.

According to some further detailed embodiments regarding the control of carrier aggregation described above, operations may be carried out which are illustrated in the FIGS. 2A to 2E described in the following. That is, the processor 11 shown in FIG. 1 may be configured to carry out the operations shown in these figures. It is noted that the operations illustrated in the FIGS. 2A to 2E can be also made in different apparatuses.

Figure 2A:
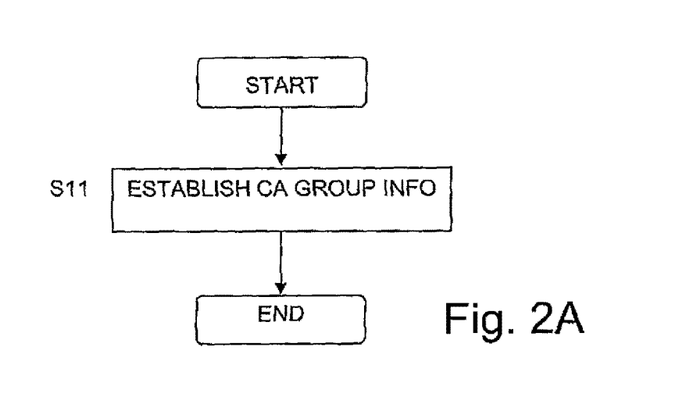
FIGS. 2A to 2H show basic operations according to an embodiment of the present invention.
Figure 2B:
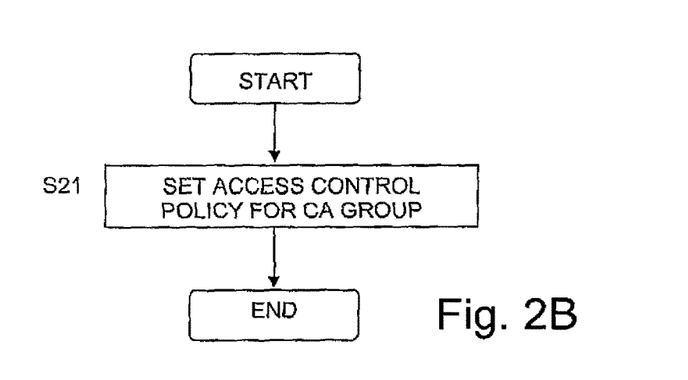
Figure 2C:
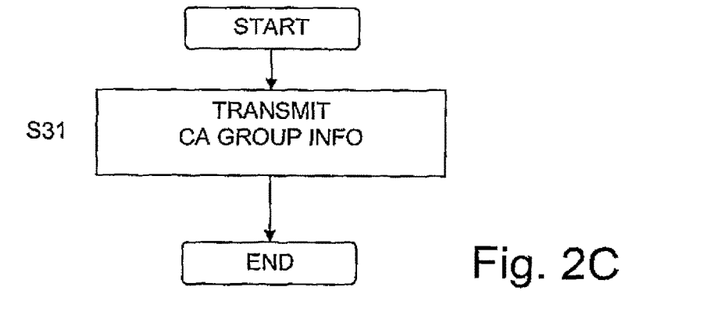
Figure 2D:
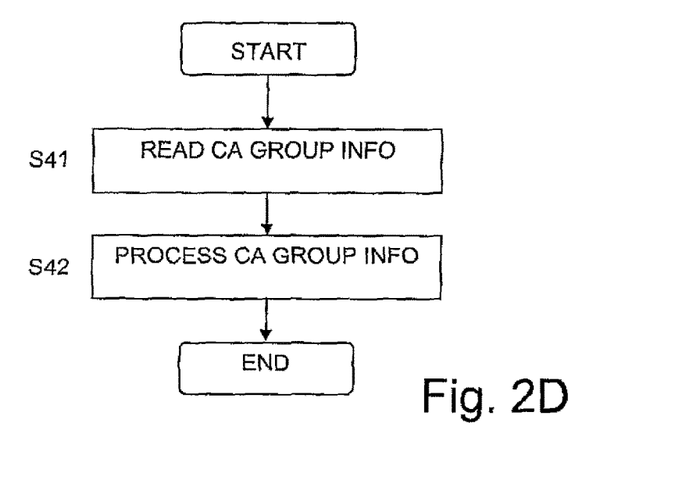
Figure 2E:
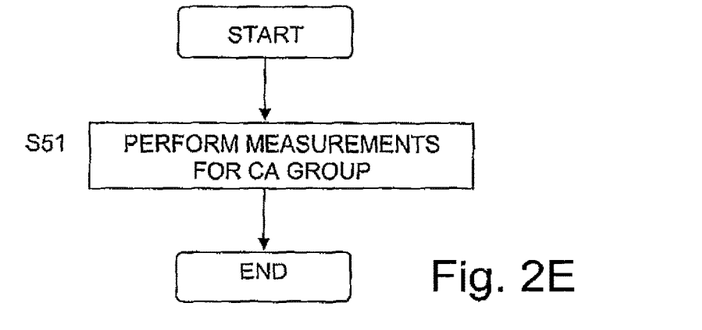
Figure 2F:
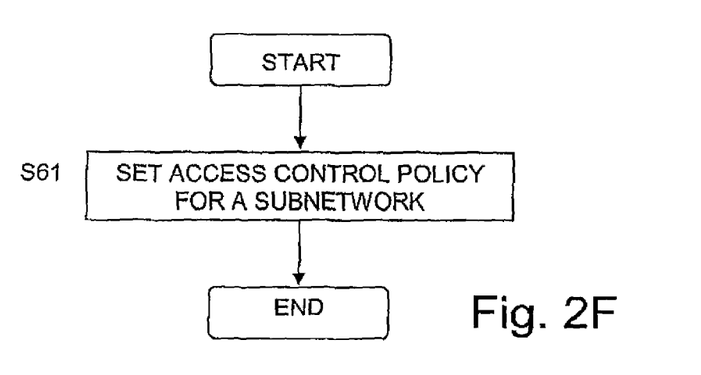
Figure 2G:
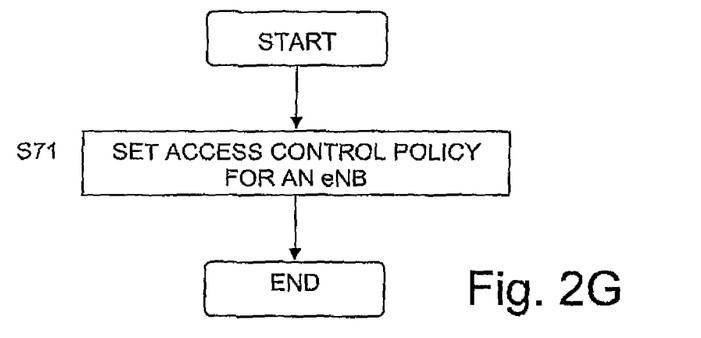
Figure 2H:
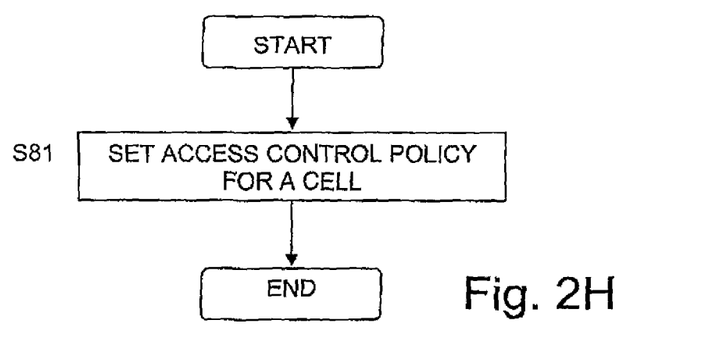

FIGS. 2A to 2H illustrate basic operations as carried out by the apparatus 1 of FIG. 1, for example, wherein FIG. 2A describes establishing of carrier aggregation group information, FIG. 2B describes setting access control policy for carrier aggregation group, FIG. 2C describes transmitting the carrier aggregation group information, FIG. 2D describes applying or processing the carrier aggregation group information, FIG. 2E describes performing measurements for carrier aggregation group, and FIGS. 2F to 2H describe some further examples of setting an access control policy.

In FIG. 2A, in operation S11 CA group info (as an example for carrier aggregation group information regarding a group of cells in a radio network which can be aggregated) is established.

In FIG. 2B, in operation S21 the access control policy is set for CA group (as an example for carrier aggregation group regarding a group of cells in a radio network which can be aggregated) to an eNB controlling the CA group.

In FIG. 2C, in operation S31 the CA group info (as an example for carrier aggregation group information regarding a group of cells in a radio network which can be aggregated) is transmitted to an eNB that needs this info.

In FIG. 2D, in step S41 the CA group info is read by an eNB, for example, and in step S42, the read carrier aggregation group information is processed. For example, when an eNB carries out the operation of FIG. 2D, the eNB may receive the CA group info from another eNB to which a handover of a user equipment it to be performed, and use the CA group info in order to decide which cells to be involved in the handover.

In FIG. 2E, in operation S51 the performance measurements are performed for CA group (as an example for carrier aggregation group regarding a group of cells in a radio network which can be aggregated), for example in the eNB.

Thus, according to embodiments of the present invention, information regarding CA groups (groups of cells which can be aggregated together) is provided. Therefore, for example each eNB in the network knows which cells can be aggregated. Hence, control and management in connection with carrier aggregation can be improved.

It is noted that the above described setting of an access control policy is not restricted to be applied to a certain CA group only. Such a policy could also be configured to be applied to a part of the network, for example, a whole subnetwork or individual eNBs. Examples for these measures are shown in FIGS. 2F to 2H.

In FIG. 2F, the access control policy is set for a subnetwork (S61). In FIG. 2G, the access control policy is set for an eNB (S71). In FIG. 2H, the access control policy is set of a cell (S81).

The access control policy may be to indicate, in case of insufficient resources, access of a user equipment to the part of the network (e.g., subnetwork, eNB or cell) is denied, or access of the user equipment is admitted and resources for existing services are reduced.

In the following, some more detailed embodiments of the present invention are described.

I. Management of the group of cells which can be aggregated together is provided. For example, a new IOC for CA group can be modelled, or the CA group can be modelled as an attribute to the existing IOCs, such as EUtranCell IOC or ENBFunction IOC.

II. The CA group information is made available in ANR. In particular, the CA group information can be included when exchanging the cell info via X2 interface (defined between two eNBs).

III. The CA group information can be made available in manual neighbours setup. For example, regarding the IOC containing the CA group (either a new IOC or an existing IOC), the CA group information can be included in an ExternalEUtranCell IOC. For example, the new IOC for CA group can be made such that it contains the information of the ExternalEUtranCell, or alternatively the CA group information can be included as a new attribute to the existing ExternalEUtranCell IOC.

IV. Measurement of performance of CA can be defined. In particular, performance measurements for E-RAB or QCI (e.g., number of E-RABs, and/or the QoS/throughput for each QCI) can be defined on the CA Group granularity.

V. Arbitration of new access requests in case of insufficient resources for CA can be defined. In particular, a policy can be set by OAM to the eNB on the priority to admit the new accesses or retain the QoS/bandwidth for the existing services. As already mentioned above, the setting of an access control policy is not restricted to be applied to a certain CA group only, such a policy could also be configured to be applied to a part of the network.

Embodiments of the present invention may be implemented in the NMS, EMS, a separate SON server or eNB with support from external management interface.

The following examples show in the typical format of a 3GPP 32.series and 36.423 stage 2 description how the solution can be realized.

For solutions I) and III) in common, following attribute is added to the ENBFunction IOC, which is defined in TS 32.762.

| Attribute | Definition | Legal Values |
|---|---|---|
| CaGroupCellList | It identifies a list of cells which are the members of the CA group. | List of CaGroup CA group: { CaGroupId: String; CaCellList: List of CaCellInfo { LayerNumber: integer (O); CellList: List of DN of EUtranCellFDD/EUtranCellTDD IOCs} } |

Alternatively, as mentioned above, a new IOC (having, e.g., the name CaGroup) can be modeled for each CA group following in TS 32.762.

| Attribute | Definition | Legal Values |
|---|---|---|
| CaGroupCellList | It identifies a list of cells which are the members of the CA group. | List of CaCellInfo { LayerNumber: integer (O); CellList: List of DN of EUtranCellFDD/EUtranCellTDD or ExternalEUtranCellFDD/ ExternalEUtranCellTDD IOCs} |

Further alternatively, or in addition to the above, the following attribute may be added to the EUtranGenericCell IOC (TS32.762):

| Attribute | Definition | Legal Values |
|---|---|---|
| memberOfCaGroupList | It identifies which CA groups the cell is a member of. | List of CaGroup { MyLayerNumber: integer (O); CaGroupId (or CaGroupDn): String (or DN)} |

Further alternatively, or in addition to the above, the following attribute may be added to the ExternalEUtranGenericCell IOC, as defined in TS 32.762:

| Attribute | Definition | Legal Values |
|---|---|---|
| memberOfCaGroupList | It identifies which CA groups the cell is a member of. | List of CaGroup { (or CaGroupDn) MyLayerNumber: integer (O); CaGroupId (or CaGroupDn): String (or DN)} |

According to a further embodiment regarding an implementation for solution II described above, the CA group info is added to "X2 SETUP RESPONSE" (as a further example for an information message or information message type). That is, the corresponding definition as given in 3GPP TS 36.423 V11.0.0 (March 2012), chapter 9.1.2.3, may be augmented as indicated in the table shown in FIG. 4A.

Figure 4A:
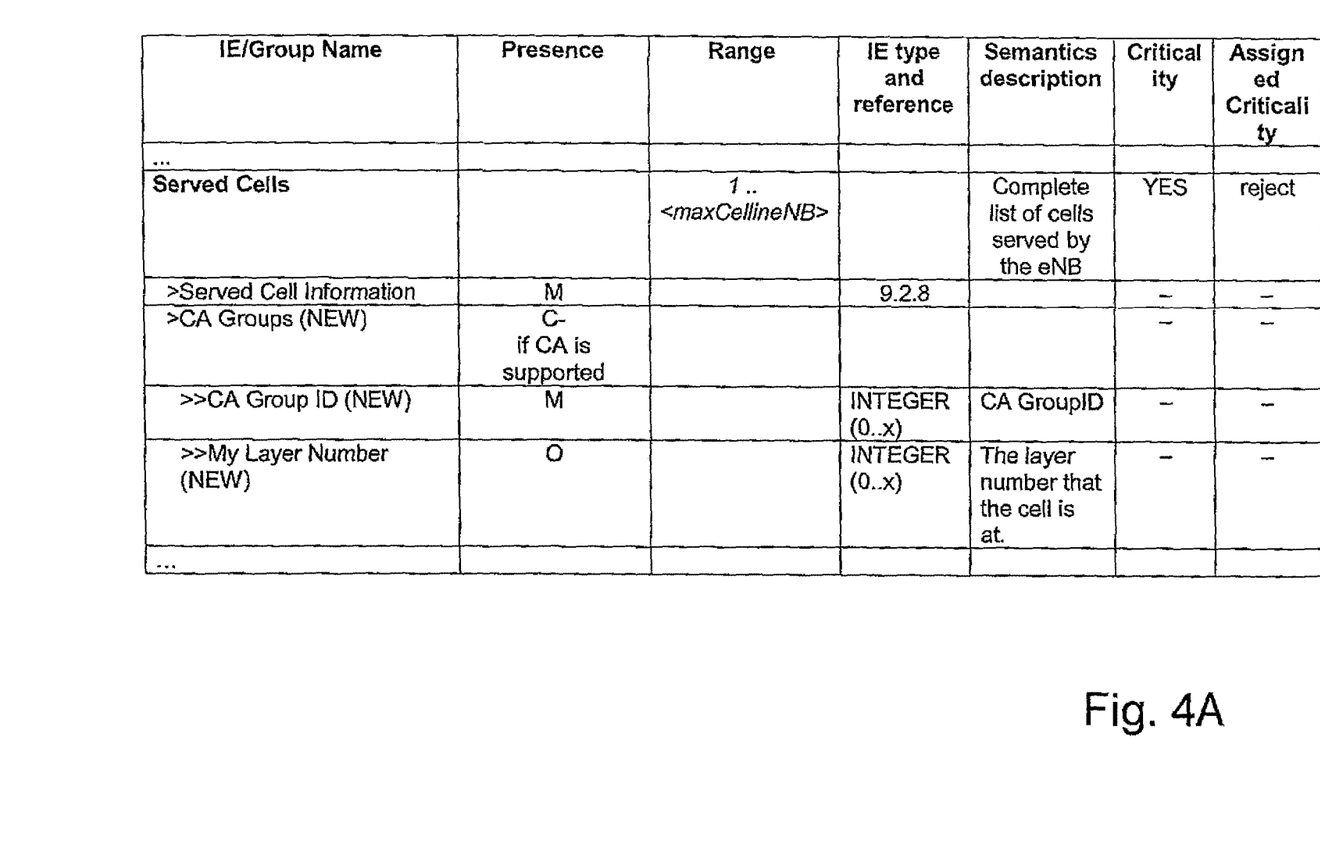
FIGS. 4A to 4C show tables of examples for including CA group info into an information element of a message or an into IOC according to embodiments of the present invention.
Figure 4B:
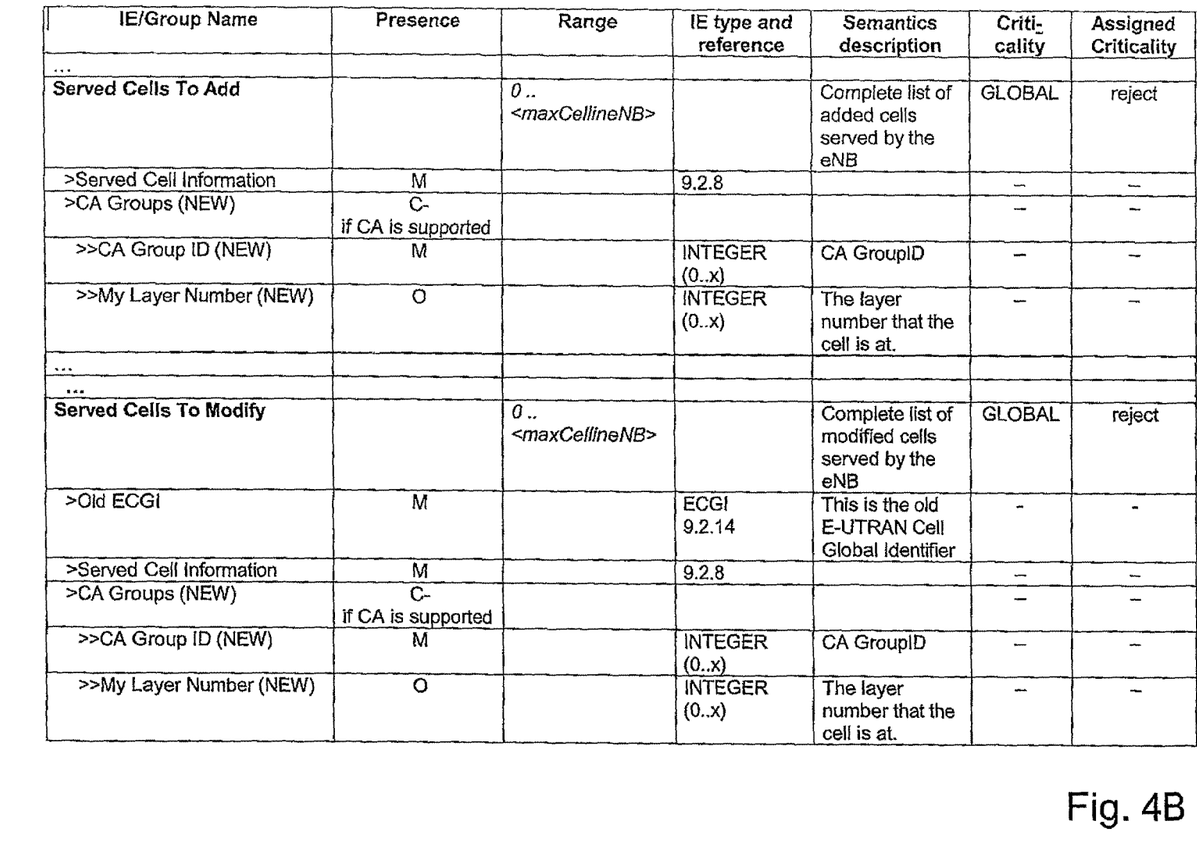
Figure 4C:
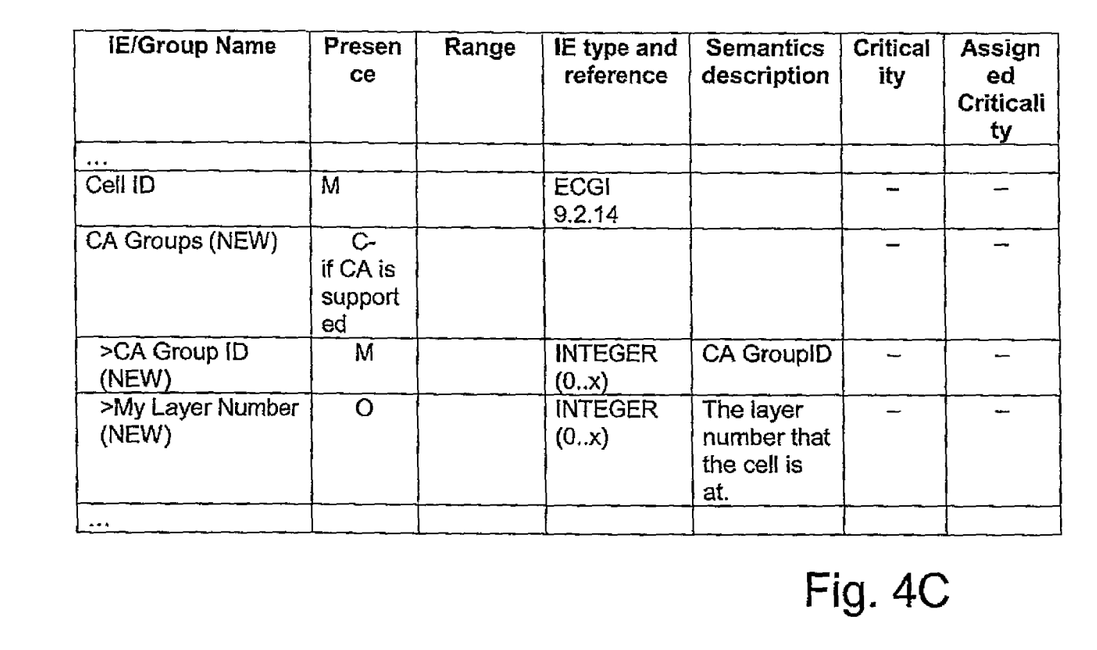

It is noted that in all tables shown in FIGS. 4A to 4C, the new elements are the rows indicated by "CA Groups (NEW) ", "CA Group ID (NEW)", and "My Layer Number (NEW) ".

Moreover, the abbreviations used in column "Presence" have the following meanings:

M: IEs marked as Mandatory (M) shall always be included in the message.

O: IEs marked as Optional (O) may or may not be included in the message.

C: IEs marked as Conditional (C) shall be included in a message only if the condition is satisfied. Otherwise the IE shall not be included.

Moreover, in column "Range" the value "maxCellineNB" means a maximum number of cells that can be served by an eNB.

Furthermore, as shown in FIG. 4B, the CA group information may be added to the "ENB CONFIGURATION UPDATE" message (as another example for an information message or information message type). That is, the corresponding definition as given in 3GPP TS 36.423 V11.0.0 (March 2012), chapter 9.1.2.8, may be augmented as indicated in the table shown in FIG. 3B.

Further alternatively, as shown in FIG. 4C, the CA group info may be added to the may be added to the "Served Cell Information" TE as defined in TS 36.423.

With respect to solution IV described above, i.e., regarding CA group measurements, such measurements related to E-RAB or QCT should be configured such that they are performed on the CA group level rather than on cell level. This may be defined in TS 32.425, for example, by adding the following statement under section 4.2 and 4.4: "in case of CA, the measurements defined in this section are measured at each CA Group".

With respect to solution V described above, the following attributes may be added to ENBFunction IOC or the newly created CaGroup IOC (according to Solution I)) in TS 32.762 or to a newly created CaPolicies IOC in TS 32.522:

| Attribute | Definition | Legal Values |
|---|---|---|
| NewAccessPriority | It identifies priority of new access request in case of insufficient resources for CA | ENUM of { FullAdmissionOfNewAccess (which means to fully admit the new access request by downgrading the QoS to the existing connected UEs with the same or lower level of service priority compared to the accessing UE); BestEffortAdmissionOfNewAccess (which means allowing to downgrade the QoS to the existing connected UEs with the same or lower level of service priority compared to the accessing UE and the QoS of the new access request to (fully/partially) admit this request by best effort) NoAdmissionOfNewAccess (which means to ignore the new access by retaining the QoS to the existing connected UEs); } |

Thus, according to certain embodiments of the present invention, information regarding a group of cells which can be aggregated is provided in a network in a standardized way, to that those network elements which need this information can easily have access to this information.

Embodiments of the present invention helps the eNB for selection of right set of cells for aggregation with one UE.

Embodiments of the present invention also helps the eNB for selection of right set of cells for handover in CA, especially for inter-eNB HO.

Moreover, according to embodiments of the present invention, meaningful measurements for CA are possible.

Furthermore, according to embodiments of the present invention, network operators are able to control the CA behaviour as desired by operator policies.

It is noted that the embodiments and the present invention in general is not limited to the specific examples given above.

According to embodiments of the present invention, a method and an apparatus are described by which carrier aggregation in a radio network is controlled on the basis of a group of cells which can be aggregated. For example, carrier aggregation group information regarding the group of cells which can be aggregated can be established, transmitted, read and the like, access control policy regarding the group of cells in the radio network which can be aggregated can be set. Moreover, a method and an apparatus is provided by which carrier aggregation in a radio network is controlled, wherein an access control policy regarding a part of the radio network is set.

According to a further aspect of embodiments of the present invention, an apparatus is provided which comprises
- means for providing connection to a radio network and/or a network control element, and
- means for controlling carrier aggregation in a radio network on the basis of a group of cells which can be aggregated.

According to another aspect of embodiments of the present invention, an apparatus is provided which comprises
- means for providing connection to a radio network and/or a network control element,
- means for controlling carrier aggregation in a radio network, and
- means for setting an access control policy regarding a part of the radio network.

It is to be understood that any of the above modifications can be applied singly or in combination to the respective aspects and/or embodiments to which they refer, unless they are explicitly stated as excluding alternatives.

For the purpose of the present invention as described herein above, it should be noted that
- an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
- a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;
- method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

What is claimed is:
1. A method, comprising:
controlling carrier aggregation in a radio network on the basis of a group of cells which can be aggregated;

setting access control policy for the group of cells in the radio network which can be aggregated, wherein the access control policy is to indicate, in case of insufficient resources:
  access of a user equipment to the group of cells is denied, or
  access of the user equipment to the group of cells is admitted and resources for existing services are reduced;
establishing, by a core network element of the radio network, carrier aggregation group information comprising the group of cells which can be aggregated; and
transmitting, from the core network element to a base station of the radio network, at least the carrier aggregation group information and the access control policy.

2. The method according to claim 1, further comprising:
selecting suitable cells belonging to a carrier aggregation group to perform carrier aggregation for a user equipment based on the carrier aggregation group information.

3. The method according to claim 1, further comprising:
selecting suitable cells belonging to a carrier aggregation group to be involved in a handover of a user equipment based on the carrier aggregation group information.

4. The method of claim 1, wherein the carrier aggregation group information is included in at least one of: an information message of a predefined information message type, and a dedicated information object class modeling the carrier aggregation group.

5. A non-transitory computer readable memory comprising computer program instruction which when executed by a device causes the device to perform the method according to claim 1.

6. The method according to claim 1, wherein the core network element comprises at least one of: a network management system, an element management system, and a separate self-organizing server, and wherein transmitting the carrier aggregation information comprises:
  transmitting the carrier aggregation information and the access control policy from at least one of: the network management system, the element management system, and the separate self-organizing server.

7. An apparatus comprising
at least one memory comprising program code,
at least one processor,
the at least one memory and the program code configured, with the at least one processor, to cause the apparatus at least to:
  provide connection to at least one of a radio network and a network control element;
  control carrier aggregation in a radio network on the basis of a group of cells which can be aggregated;
  set access control policy for the group of cells in the radio network which can be aggregated, wherein the access control policy is to indicate, in case of insufficient resources:
    access of a user equipment the group of cells is denied, or
    access of the user equipment to the group of cells is admitted and resources for existing services are reduced;
  establish, by a core network element of the radio network, carrier aggregation group information comprising at least the group of cells which can be aggregated; and
  transmit, from the core network element to a base station, at least the carrier aggregation information and the access control policy.

8. The apparatus according to claim 7, wherein
the processor is configured to exchange the carrier aggregation group information with another base station, element management system or network management system.

9. The apparatus according to claim 7, wherein the at least one memory and the program code are further configured, with the at least one processor, to cause the apparatus at least to:
  select suitable cells belonging to a carrier aggregation group to perform carrier aggregation for a user equipment based on the carrier aggregation group information; and
  select suitable cells belonging to a carrier aggregation group to be involved in a handover of a user equipment based on carrier aggregation group information.

10. The apparatus according to claim 7, wherein at least one of:
  the carrier aggregation group information is included in an information message of a predefined information message type;
  the access control policy is included as one or more attributes in the information message of the predefined information message type; and
  the carrier aggregation group information is included as one or more attributes in the information message of the predefined information message type.

11. The apparatus according to claim 7, wherein at least one of:
  the carrier aggregation group information is included in a dedicated information object class modeling the carrier aggregation group;
  the carrier aggregation group information is included as one or more attributes of the predefined information object class; and
  the access policy information is included as one or more attributes of the predefined information object class or a dedicated information object class modeling the carrier aggregation group.

12. The apparatus of claim 7, wherein the core network element comprises at least one of: a network management system, an element management system, and a separate self-organizing server, and wherein transmission of the carrier aggregation information comprises:
  transmission of the carrier aggregation information and the access control policy from at least one of: the network management system, the element management system, and the separate self-organizing server.

13. An apparatus comprising:
at least one memory comprising program code,
at least one processor,
the at least one memory and the program code configured, with the at least one processor, to cause the apparatus to perform at least the following:
  receive, in a base station from a core network element, a-carrier aggregation group information comprising at least a group of cells which can be aggregated and an access control policy to indicate, in case of insufficient resources:
    access of a user equipment to the group of cells is denied, or
    access of the user equipment to the group of cells is admitted and resources for existing services are reduced; and control carrier aggregation in a radio network based at least on the carrier aggregation group information.

14. The apparatus of claim 13, wherein the at least one memory and the program code are configured, with the at least one processor, to cause the apparatus to:
    perform performance measurements on carrier aggregation group level; and
    determine whether to perform carrier aggregation for a user equipment using the group of cells which can be aggregated based at least partially upon the performance measurements.

15. The apparatus of claim 13, wherein the core network element comprises at least one of: a network management system, an element management system, and a separate self-organizing server.

* * * * *

UNITED STATES PATENT AND TRADEMARK OFFICE
CERTIFICATE OF CORRECTION

PATENT NO. : 9,655,117 B2  
APPLICATION NO. : 14/403207  
DATED : May 16, 2017  
INVENTOR(S) : Yao et al.

Page 1 of 1

It is certified that error appears in the above-identified patent and that said Letters Patent is hereby corrected as shown below:

In the Claims

Claim 13, Column 12, Line 59 "a-carrier" should be deleted and --carrier-- should be inserted.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*